US010094087B2

(12) United States Patent
Prashar et al.

(10) Patent No.: US 10,094,087 B2
(45) Date of Patent: Oct. 9, 2018

(54) METHOD AND APPARATUS FOR STABILIZING SLOPES AND EMBANKMENTS WITH SOIL LOAD TRANSFER PLATES

(71) Applicant: Geopier Foundation Company, Inc., Davidson, NC (US)

(72) Inventors: Yogesh Prashar, Davidson, NC (US); Richard Short, Davidson, NC (US); Miriam Smith, Reno, NV (US)

(73) Assignee: GEOPIER FOUNDATION COMPANY, INC., Davidson, NC (US)

( * ) Notice: Subject to any disclaimer, the term of this patent is extended or adjusted under 35 U.S.C. 154(b) by 0 days.

(21) Appl. No.: 14/911,758

(22) PCT Filed: Aug. 14, 2014

(86) PCT No.: PCT/US2014/050999
§ 371 (c)(1),
(2) Date: Feb. 12, 2016

(87) PCT Pub. No.: WO2015/023812
PCT Pub. Date: Feb. 19, 2015

(65) Prior Publication Data
US 2016/0194847 A1    Jul. 7, 2016

Related U.S. Application Data

(60) Provisional application No. 61/865,758, filed on Aug. 14, 2013.

(51) Int. Cl.
*E02B 3/12* (2006.01)
*E02D 5/02* (2006.01)
*E02D 7/02* (2006.01)

(52) U.S. Cl.
CPC .................. *E02D 5/02* (2013.01); *E02B 3/12* (2013.01); *E02D 7/02* (2013.01)

(58) Field of Classification Search
CPC ..... E02B 3/12; E02B 3/14; E02D 5/02; E02D 7/02; E02D 17/20
See application file for complete search history.

(56) References Cited

U.S. PATENT DOCUMENTS 1,073,278 A * 9/1913 Mosher ..................... E02B 3/10
404/7
2,880,588 A * 4/1959 Moore ................. E02D 29/0266
405/285

(Continued)

FOREIGN PATENT DOCUMENTS

CN         202865855 U      4/2013
DE         2914046 A1      10/1980
(Continued)

OTHER PUBLICATIONS

Maitsuharu, et al.; JPH08128047 Machine Translation; May 1996.*

*Primary Examiner* — Benjamin F Fiorello
(74) *Attorney, Agent, or Firm* — Nexsen Pruet, PLLC; E. Eric Mills

(57) ABSTRACT

A system for and method of stabilizing slopes and embankments using one or more soil load transfer elements are disclosed. The present subject matter provides for an efficient method and apparatus for stabilizing shallow landslides and slope instabilities for failing and near-failing soil masses that are underlain by soil materials. The system may include a plurality of load transfer plates affixed to a pile or load transfer section in varying configurations. In one embodiment, one or more upper load transfer plates are preferably used to capture the downslope-moving soil mass and transfer the applied loads to the intermediary pile section. In another embodiment, a plurality of upper load (Continued)

transfer plates can be used to transfer applied loads to a lower pile section.

58 Claims, 16 Drawing Sheets

(56) References Cited

U.S. PATENT DOCUMENTS

| | | | | |
|---|---|---|---|---|
| 3,412,561 A | * | 11/1968 | Reid | E02D 17/20 |
| | | | | 405/15 |
| 4,796,398 A | | 1/1989 | Golovko et al. | |
| 5,797,706 A | * | 8/1998 | Segrestin | E02D 29/0225 |
| | | | | 405/262 |
| 6,474,028 B2 | * | 11/2002 | Cusimano | E02D 5/805 |
| | | | | 52/153 |
| 6,524,027 B1 | * | 2/2003 | Fabius | E01B 2/006 |
| | | | | 405/16 |
| 6,666,625 B2 | * | 12/2003 | Thornton | E04H 12/2215 |
| | | | | 256/65.02 |
| 7,090,440 B1 | | 8/2006 | Short | |
| 7,811,032 B2 | | 10/2010 | Short | |

FOREIGN PATENT DOCUMENTS

| | | | |
|---|---|---|---|
| DE | 4226067 A1 | 5/1993 | |
| JP | 8128047 A2 | 5/1996 | |

\* cited by examiner

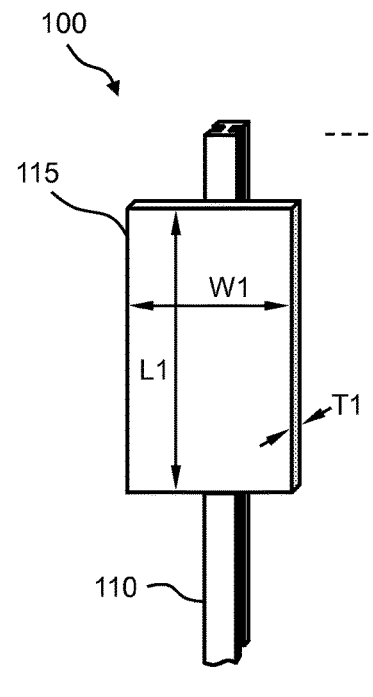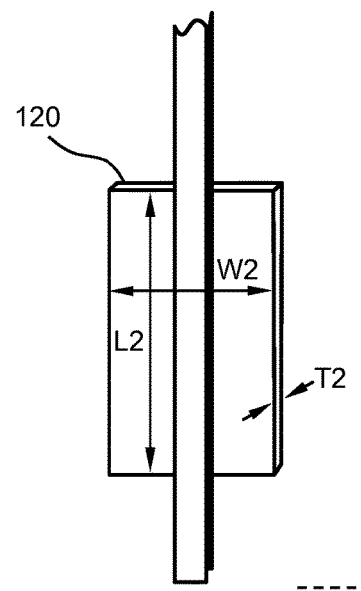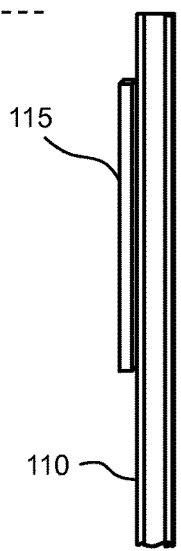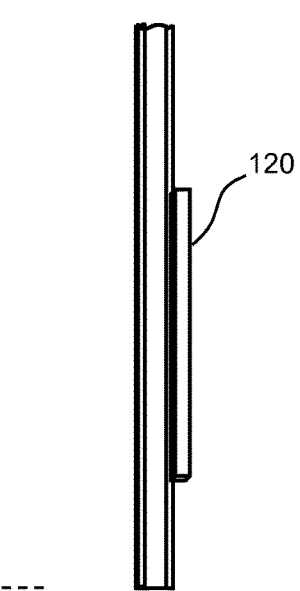
FIG. 1A            FIG. 1B

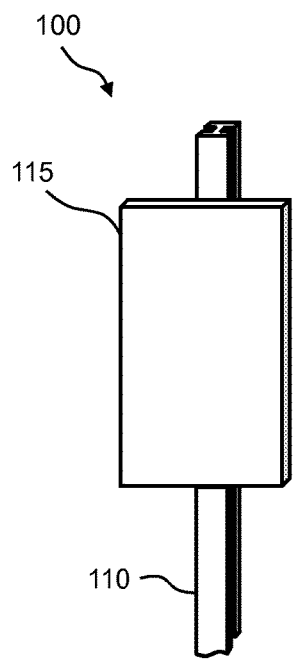
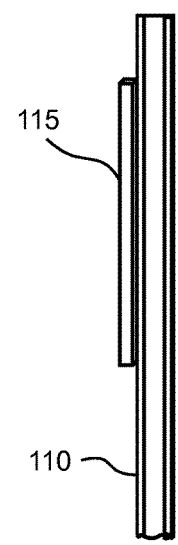
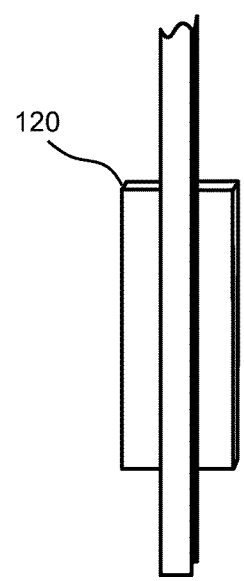
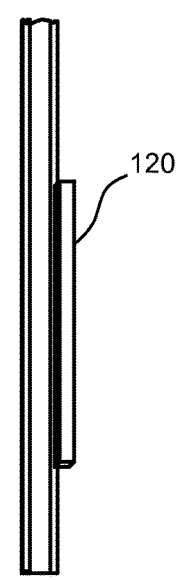
*FIG. 4A*  *FIG. 4B*

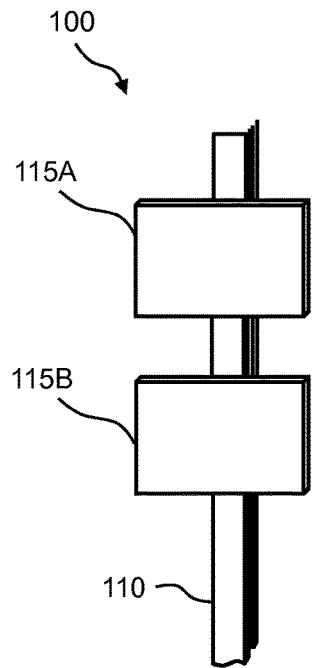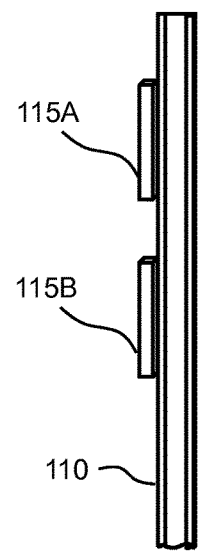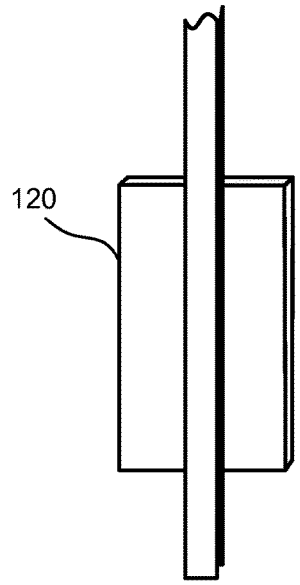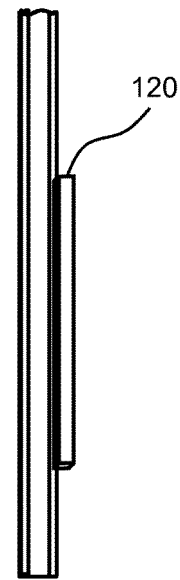
FIG. 7A  FIG. 7B

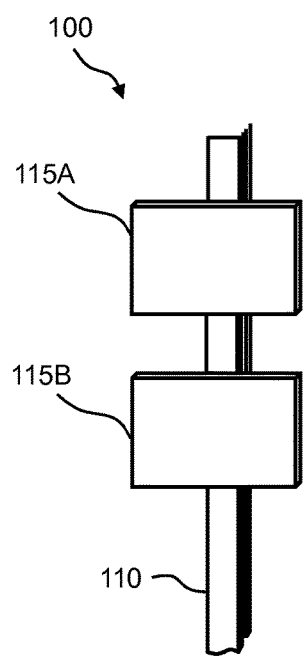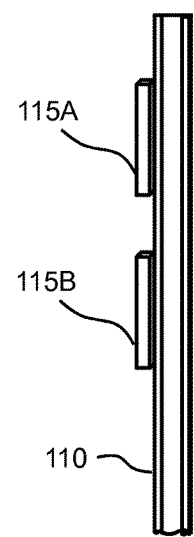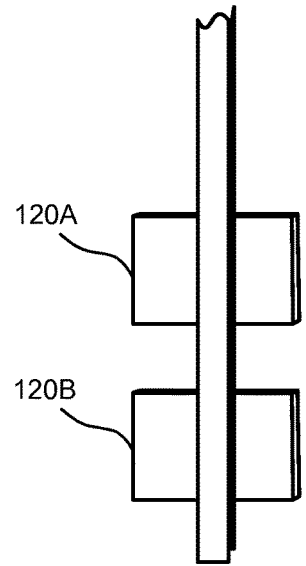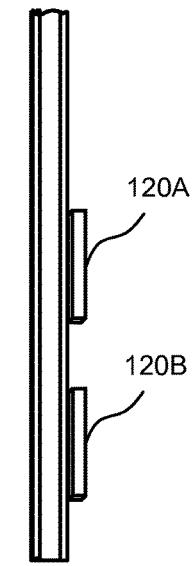
*FIG. 8A*  *FIG. 8B*

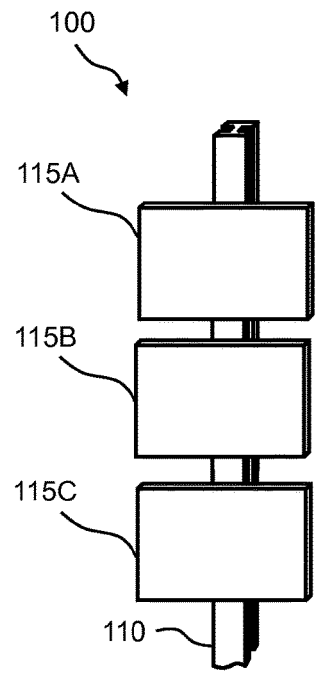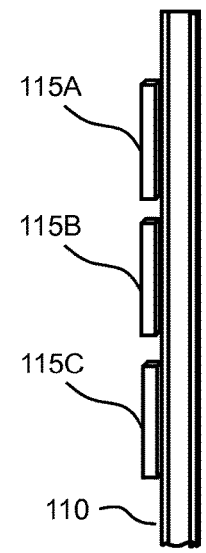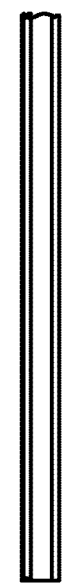
*FIG. 9A*  *FIG. 9B*

METHOD AND APPARATUS FOR STABILIZING SLOPES AND EMBANKMENTS WITH SOIL LOAD TRANSFER PLATES

CROSS REFERENCE TO RELATED APPLICATIONS

This application is a 35 U.S.C. § 371 U.S. national phase entry of International Application No. PCT/US2014/050999 entitled "Method and Apparatus for Stabilizing Slopes and Embankments with Soil Load Transfer Plates" having an international filing date of Aug. 14, 2014 which claims the benefit of U.S. Provisional Application Serial No. 61/865,758 filed Aug. 14, 2013, each of which is incorporated by reference herein in its entirety.

TECHNICAL FIELD

The subject matter disclosed herein relates generally to slope stabilization, and more particularly to a system for and method of stabilizing slopes and embankments using a soil load transfer apparatus.

BACKGROUND

There are many situations where it is important to stabilize sloping or non-sloping ground. Natural slopes such as those on hillsides or created by excavating highway grades may be temporarily stable but then become unstable with time as a result of, for example, material weathering, changes in moisture content, and increases in ground water pressures. Unstable slopes may be created during certain types of construction, such as freeway widening, golf course construction, or other types of construction where the ground is altered. These slopes may be naturally occurring or they may be the result of human activity. These slopes often need stabilization, even when there are no immediate signs of slope failure.

Similarly, it may be desirable for safety reasons, to strengthen certain slopes that are relatively stable, whether naturally occurring or the result of human activity. For example, it is prudent to stabilize slopes behind power plants, or slopes at the base of dams or bridges, even when the slope does not appear to be at or near failure. Also, non-sloping ground adjacent to water may benefit from stabilization.

Most of the research and work on slope and ground stabilization relates to stabilizing landslides. Research on mitigation techniques for shallow, colluvial landslides has seen some interest from the geotechnical community in the past 20 years, although most research has been performed on the predictive analysis of these types of slides (e.g., Aubeny and Lytton, 2004; Cho and Lee, 2002; Collins and Znidarcic, 2004; Iverson, 2000). Predictive analysis techniques are an important aspect of understanding slope stability behavior. Existing methods of landslide mitigation have also been summarized by Rogers (1992). They include excavation and recompaction, conventional retention structures, subdrainage, soil reinforcement using geomembranes and geosynthetics, mechanically stabilized embankments, and combination mechanically stabilized retention structures. However, it may be desirable to stabilize ground or slopes, even when there is no direct prediction of failure, for safety reasons.

Others, such as Ito et al. (1981, 1982), have addressed rotational landslides. These deep landslides have been mitigated with extremely long (25-100 feet (7.6-30.5 meters)) columns (piles) placed in a portion of the potential slide area, generally at the toe of the slope to lock down the base of the potential slide. However, these long, heavy piles are often prohibitively expensive.

Patents have issued describing some of the above-mentioned techniques. Devices and techniques for large scale slope stabilization are described in U.S. Pat. No. 2,880,588 issued to Moore, U.S. Pat. No. 5,797,706 issued to Segrestin et al., German Patent No. DE 4226067 issued to Hermann, and Japanese Patent No. JP 57071931 issued to Yoshihisa. However, these large-scale retaining walls require the use of heavy equipment, and are unsuitable for stabilizing smaller, less accessible slopes.

Other patents deal with stabilizing soil that is adjacent to water, for example U.S. Pat. No. 1,073,278 issued to Mosher, U.S. Pat. No. 3,412,561 issued to Reid, and U.S. Pat. No. 6,659,686 issued to Veazey. However, these patents do not specifically address slope stabilization of shallow landslides.

Still other patents describe the use of posts or anchors. See, e.g., U.S. Pat. No. 1,408,332 issued to Zimmerman, U.S. Pat. No. 1,433,621 issued to Hutton, U.S. Pat. No. 4,530,190 issued to Goodman, U.S. Pat. No. 1,109,020 issued to Skiff et al., U.S. Pat. No. 6,666,625 issued to Thornton, U.S. Pat. Nos. 7,090,440 and 7,811,032 to Short, and German Patent No. D334,121 issued to Van Handel III.

Unfortunately, most of these mitigation options are often not useful, mainly due to economic considerations. Retention structures, soil reinforcement options, mechanically stabilized embankments, and combination structures all require large volumes of earthworks in addition to comparatively expensive and time consuming installation methods.

Steel sheet piles have also traditionally been used to stabilize slopes and grade separation structures. The sheet piles are driven into the ground from the ground surface and pass through both the yielding unstable ground and downward into the stable ground. The upper portion of the sheet piles captures the driving forces; the lower portion transfers driving forces to the adjacent soil; and the portion of the sheet pile that extends through the interface of the stable and unstable soil horizons transfers the driving shear load and bending moments to the lower resisting portion of the section. Although the system is robust, it is also expensive because of the high cost of steel that is used in the sections. For this reason, they are seldom used.

U.S. Pat. Nos. 7,090,440 and 7,811,032 issued to Short deal with stabilizing shallow failing slopes with plate piles consisting of a unitary steel plate affixed to a pile stem. Each plate pile is configured to "catch" a volume of downslope-moving soil within the sliding soil mass. The pile stem transfers the applied load into the underlying competent materials. The plate pile system marks an improvement over steel sheet piles because the plate piles are installed a few feet on-center allowing for the use of less steel and a more efficient pile stem section to transfer the applied shear loads and bending moments. The system, however, was developed for installation in soil profiles characterized by weathered residual soil overlying competent very stiff soil and soft rock wherein the thin pile stem is small enough to be easily driven into the hard lower materials and wherein the pile stem transfers its load efficiently into these hard underlying materials. However, a shortcoming of this system is that it does not efficiently transfer load into underlying stable medium stiff soil layers commonly associated with levees and other earthen structures.

SUMMARY

The present invention provides for an efficient system and method for stabilizing shallow landslides and slope instabilities for failing and near-failing soil masses that are underlain by soil materials. The method may include driving one or more soil load transfer elements through the failing or near-failing soil materials and into the underlying unfailing soil materials at a prescribed spacing and to a prescribed depth.

The system for stabilizing shallow landslides and slope instabilities for failing and near-failing soil masses that are underlain by soil materials may include one or more soil load transfer elements that include a load transfer section having one or more upper plates coupled to an upper portion and one or more lower plates coupled to a lower portion. In one example, the soil load transfer element may include two upper plates coupled to the upper portion. In another example, the load transfer element may have three upper plates coupled to the upper portion. Similarly, some embodiments of the load transfer element may have two lower plates coupled to the lower portion or three lower plates coupled to the lower portion. The load transfer section of the load transfer element may include any one of steel, concrete, and reinforced plastics. The width of the one or more upper plates and one or more lower plates may be in the range of about 3 inches (7.6 cm) to about 5 feet (1.5 meters). The length of the one or more upper plates may be determined based on the thickness of an unstable and/or marginally stable soil mass on or within a slope and/or embankment.

In certain other embodiments, a soil load transfer element is provided that includes a load transfer section having an upper portion and a lower portion and two or more upper plates coupled to the upper portion. In one example, the load transfer element may include three upper plates coupled to the upper portion. In other examples, the load transfer may also include one or more lower plates coupled to the lower portion, including two lower plates or three lower plates.

Other embodiments of the presently disclosed material include a soil load transfer system for stabilizing a slope and/or embankment that includes one or more of the load transfer elements discussed above. The elements of the system may be configured to have sufficient strength and cross-sectional area at an interface to adequately transfer the applied loads, which result in bending moments within the load transfer section resisted by a section modulus (S) of the load transfer section. The one or more lower plates may also be configured to be wide enough such that the applied load is transferred in lateral bearing to lower stable soil without "slicing" into the lower stable soil. Additionally, the width of the one or more lower plates may be based on one or more of shear strength and stiffness of lower stable soil and applied lateral loads. Further still, the length of the one or more lower plates may be configured to transfer applied loads without excessive rotation.

The load transfer section of the elements may be configured to transfer applied loads from the one or more upper plates to the one or more lower plates, and the one or more lower plates further configured to transfer applied loads from the load transfer section into adjacent relatively stable soil. In some embodiments, a plurality of load transfer elements is provided wherein the elements are installed at a prescribed lateral spacing along the slope and/or embankment face substantially in rows and in an upslope-downslope direction. In one example, the lateral spacing may be in a range of about 3 to about 5 plate widths on-center and each upslope-downslope row is staggered.

Other embodiments of the soil load transfer system include one or more load transfer elements having two or more upper plates coupled to the upper portion of a load transfer section. The elements may include two upper plates in one example and three upper plates in another. The load transfer section of the system may be configured to transfer applied loads from the two or more upper plates to the lower portion of the load transfer section.

The present disclosure also includes a method for stabilizing a slope and/or embankment using embodiments of the soil load transfer system disclosed herein. In one example, the method includes first providing a soil load transfer system including one or more load transfer elements wherein the one or more load transfer elements comprise a load transfer section having an upper portion and a lower portion, one or more upper plates coupled to the upper portion of the load transfer section, and one or more lower plates coupled to the lower portion of the load transfer section. The method further includes driving the one or more load transfer plate elements through an unstable soil mass into an underlying relatively stable soil mass at a prescribed spacing and depth.

In some embodiments, the one or more load transfer elements are spaced apart and driven to a depth based on one or more of: a depth of the unstable soil mass, an inclination of a slope face, subsurface soil horizons, groundwater conditions, material shear strengths and stiffness, and required factors of safety against instability. In certain other embodiments, the one or more upper plates is configured to capture a downslope-moving soil mass and transfer applied loads to the load transfer section, wherein the load transfer section transfers the applied loads and bending moments from the one or more upper plates to the one or more lower plates, and further wherein the one or more lower plates transfer the applied loads from the load transfer section to adjacent relatively stable soil mass. In still other embodiments, the load transfer elements can be installed at prescribed lateral spacing along the slope face in substantially rows and in an upslope-downslope direction. In one example, the lateral spacing is in the range of about 3 to about 5 plate widths on-center and each upslope-downslope row is staggered.

In certain other embodiments, a similar method may be employed using a soil load transfer system comprising one or more load transfer elements wherein the one or more load transfer elements comprise a load transfer section comprising an upper portion and a lower portion, and two or more upper plates coupled to the upper portion of the load transfer section.

BRIEF DESCRIPTION OF THE DRAWINGS

Figure 2:
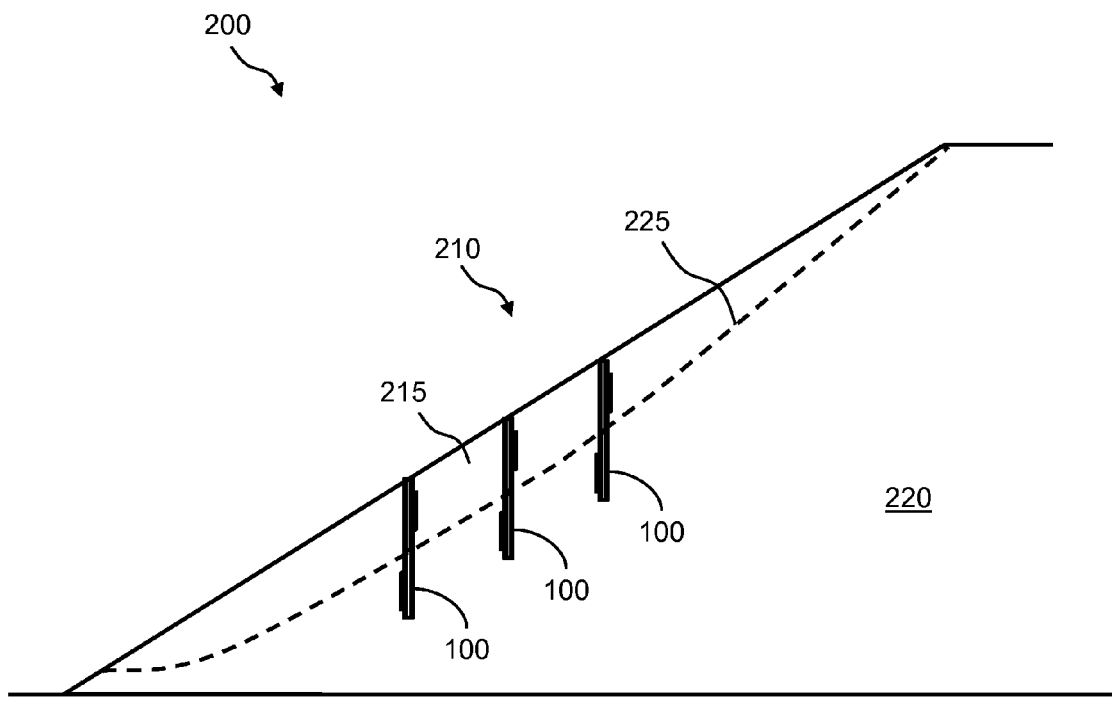
Figure 3:
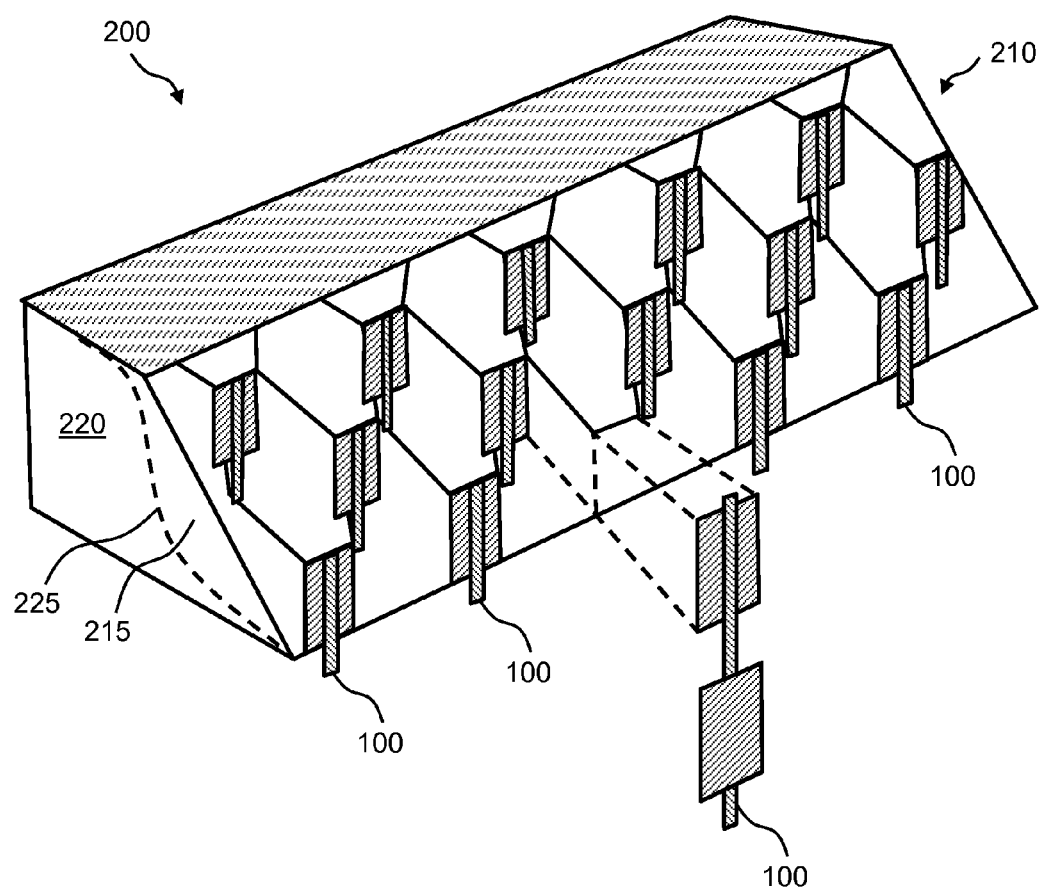
Figure 10:
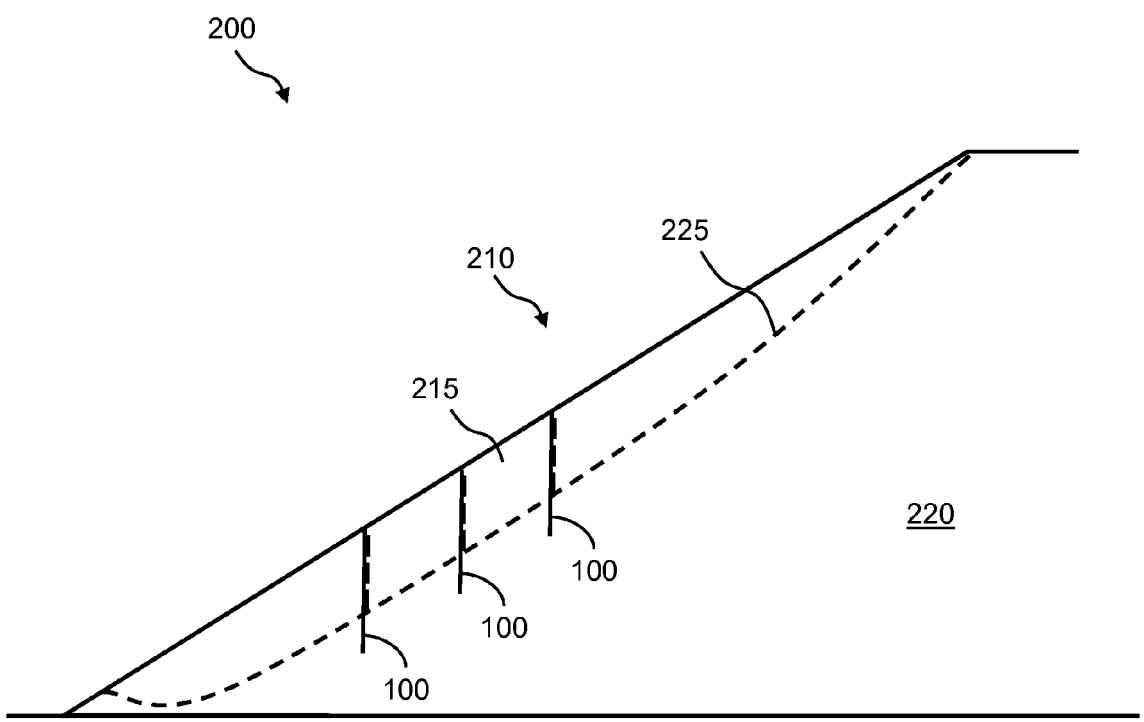
Figure 11:
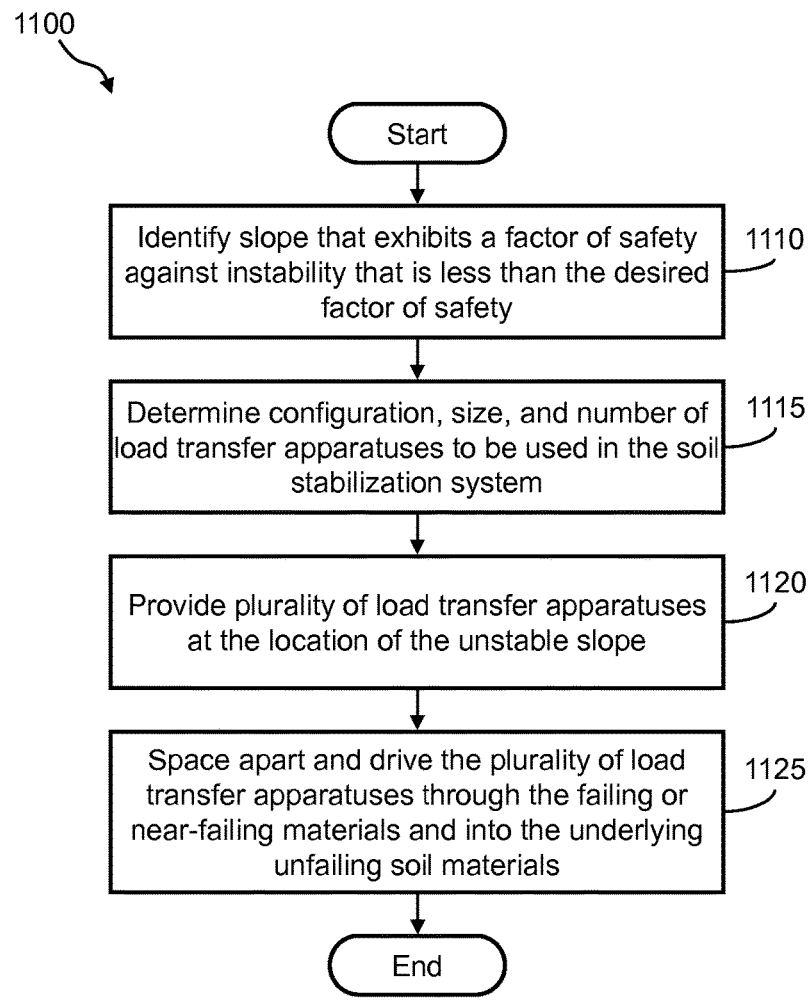
Figure 12A:
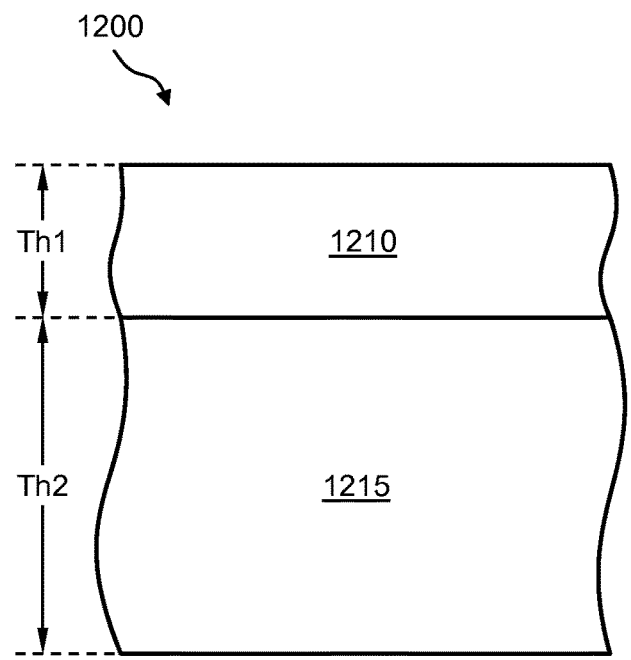
Figure 12B:
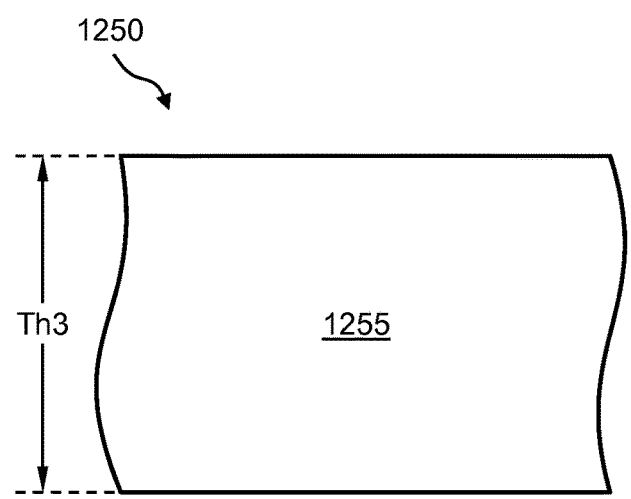
Figure 13:
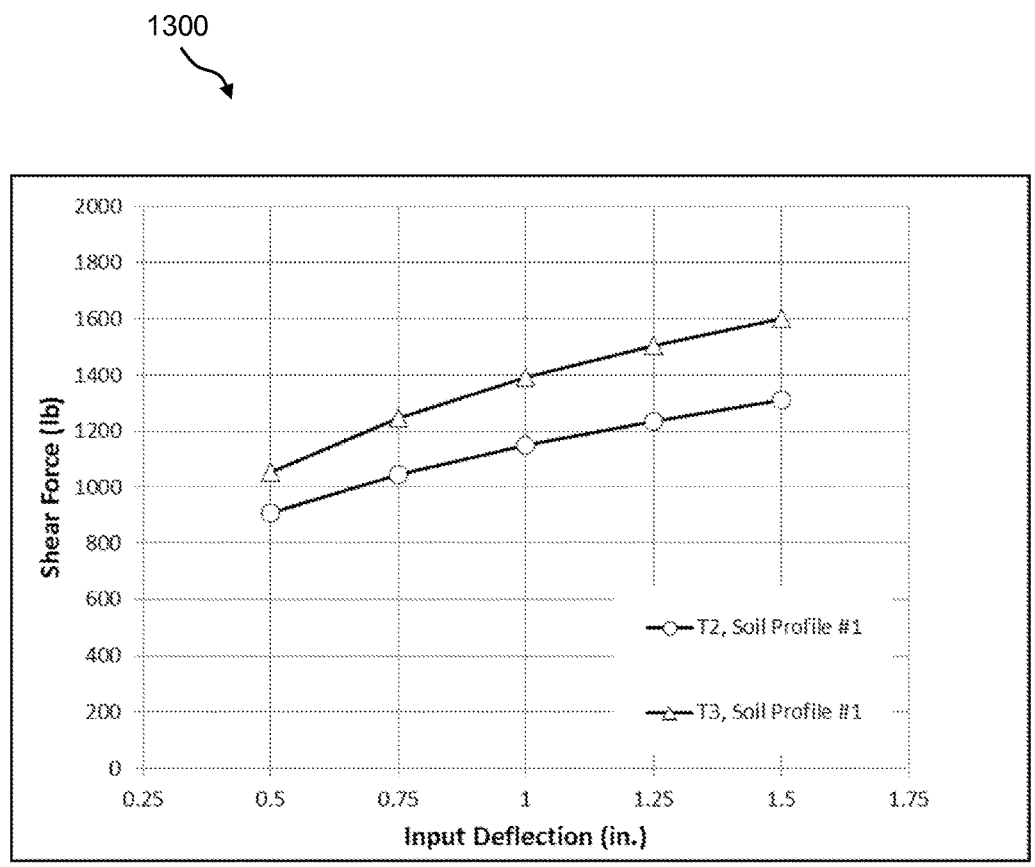
Figure 14:
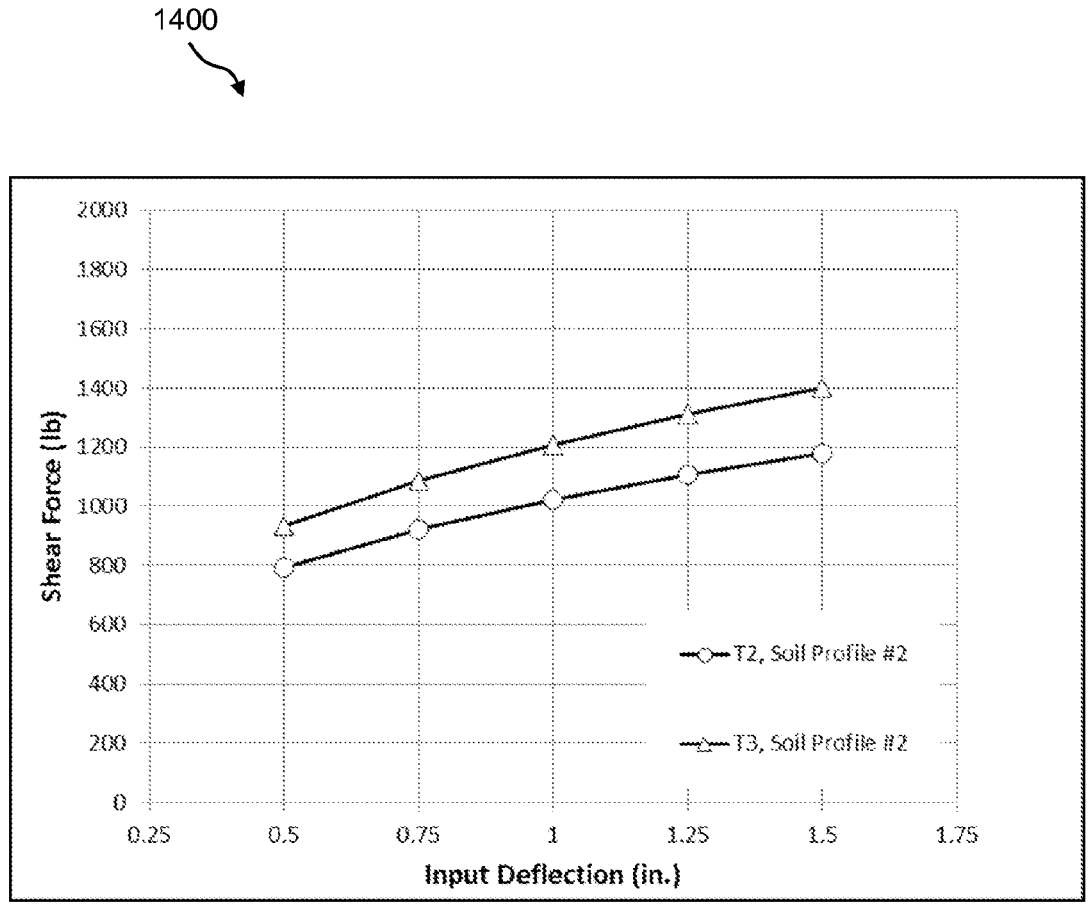
Figure 15:
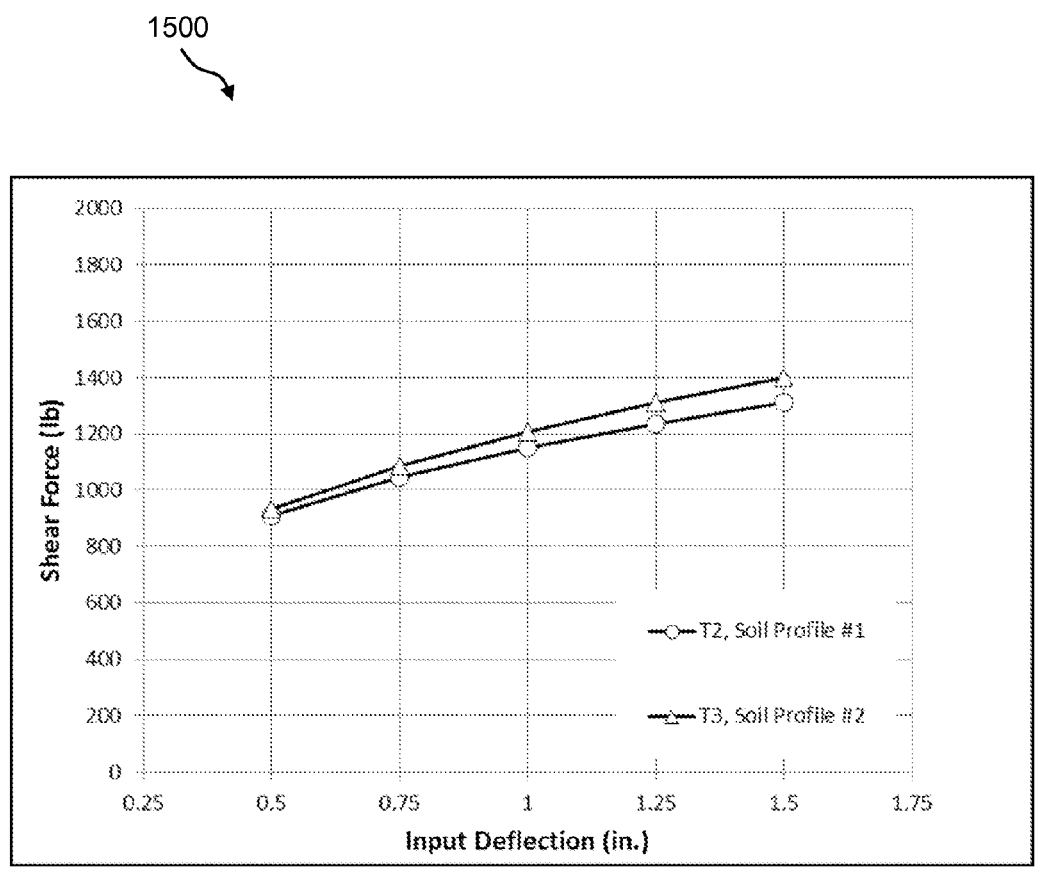

Having thus described the presently disclosed subject matter in general terms, reference will now be made to the accompanying Drawings, which are not necessarily drawn to scale, and wherein:

FIG. 1A and FIG. 1B illustrate one example configuration of a load transfer apparatus, wherein this configuration includes one upper load transfer plate and one lower load transfer plate;

FIG. 2 and FIG. 3 illustrate a cross-sectional view and a cutaway perspective view, respectively, of an example of a soil stabilization system that uses the load transfer apparatus shown in FIG. 1A and FIG. 1B;

FIG. 4A, FIG. 4B through FIG. 9A, FIG. 9B show other example configurations of the presently disclosed load transfer apparatus;

FIG. 10 illustrates a cross-sectional view of another example of the soil stabilization system, wherein the load transfer apparatus is that shown in FIG. 9A and FIG. 9B;

FIG. 11 illustrates a flow diagram of an example of a method of using the load transfer apparatus to form the soil stabilization system;

FIG. 12A and FIG. 12B illustrate the two soil profiles considered in the numerical studies;

FIG. 13 shows a plot of the shear force response of the load transfer apparatus when subjected to lateral movements ranging from 0.5 inches (1.3 cm) to 1.5 inches (3.8 cm) for the soil profile of FIG. 12A;

FIG. 14 shows a plot of the shear force response of the load transfer apparatus when subjected to lateral movements ranging from 0.5 inches (1.3 cm) to 1.5 inches (3.8 cm) for the soil profile of FIG. 12B;

FIG. 15 a plot of that compares the shear response of the T2 elements (defined hereinbelow) in the soil profile of FIG. 12A to the response of the T3 elements (defined hereinbelow) in the soil profile of FIG. 12B; and FIG. 16 a plot of the shear response of the T2 elements and the T3 elements over a range of normalized values of the depth at which sliding occurs ("d") divided by the length of the pile element ("L") for both soil profiles for an input value of 1 inch (2.5 cm) of horizontal soil movement.

DETAILED DESCRIPTION

The presently disclosed subject matter now will be described more fully hereinafter with reference to the accompanying Drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated Drawings. Therefore, it is to be understood that the presently disclosed subject matter is not to be limited to the specific embodiments disclosed and that modifications and other embodiments are intended to be included within the scope of the appended claims.

In some embodiments, the presently disclosed subject matter provides a system for and method of stabilizing slopes and embankments using one or more soil load transfer apparatuses, wherein each of the load transfer apparatuses, in one example, comprises one or more upper plates to capture the driving loads in the unstable soil materials and one or more lower plates to transfer the driving forces into stable soil materials. The one or more upper plates and the one or more lower plates are arranged along a load transfer section, wherein the load transfer section is a pile section, pile support, or pile stem. In other embodiments, the presently disclosed subject matter provides a soil load transfer apparatus that comprises, for example, multiple plates in varying arrangements.

The presently disclosed subject matter provides for an efficient system, method, and apparatus for stabilizing shallow landslides and slope instabilities for failing and near-failing soil masses that are underlain by soil materials and also provides for an efficient mechanism for transferring driving loads to the load transfer section. The method may include driving the one or more load transfer apparatuses through the failing or near-failing materials and into the underlying unfailing soil materials at a prescribed spacing and to a prescribed depth. The depth and spacing depend on, for example, the depth of the failing or near-failing soil materials, the inclination of the slope face and subsurface soil horizons, groundwater conditions, material shear strengths and stiffness, and required factors of safety against instability, among others.

The load transfer apparatus may include a plurality of load transfer plates affixed to a load transfer section. For example, one or more upper load transfer plates capture the downslope-moving soil mass and transfer the applied loads to the load transfer section, which is the intermediary pile section. The intermediary pile section transfers the applied shear loads and bending moments from the one or more upper load transfer plates to the stable soil. Optionally, the intermediary pile section may transfer the applied shear loads and bending moments to one or more lower load transfer plates that in turn are used to transfer the load from the load transfer section to the adjacent relatively stable soil mass. The advantage of the system is that each of the components of the load transfer apparatus (i.e., the upper plates, the lower plates, and the intermediary load transfer section) may be optimized to maximize its efficiency in transferring loads and bending moments using reduced volumes of steel or other materials.

An aspect of the presently disclosed system and method that use the one or more load transfer apparatuses is that it can be used for stabilizing failing soil slopes and for increasing the factor of safety against sliding failure.

Another aspect of the presently disclosed system and method that use the one or more load transfer apparatuses is that it overcomes the inefficiency of conventional systems by providing soil load transfer plates that are designed to efficiently transfer the driving loads in the unstable soil to the load transfer section and then efficiently transfer the shear loads from the load transfer section into the lower stable soil strata.

Yet another aspect of the presently disclosed system and method that use the one or more load transfer apparatuses is that it is efficient and economical to install because thick and wide steel sections, such as massive sheet piles, are not required to be installed. Thus, cost efficiencies resulting from both construction method and construction material usage result in lower construction costs and a lessening of the depletion of natural resources used for stabilization.

Referring now to FIG. 1A and FIG. 1B, an example configuration of a soil load transfer apparatus 100, wherein this configuration includes one upper load transfer plate and one lower load transfer plate is shown. The presently disclosed load transfer apparatus 100 can be termed a plate pile. FIG. 1A is a perspective view and FIG. 1B is a side view of the load transfer apparatus 100. In this example, the load transfer apparatus 100 comprises a load transfer section 110, one upper plate 115, and one lower plate 120. The upper plate has a Length L1, a Width W1, and a Thickness T1, defined in further detail hereinbelow. The lower plate similarly has a Length L2, a Width W2, and a Thickness T2, also defined in further detail hereinbelow. In this example, the upper plate 115 and the lower plate 120 are about the same size.

When installed, the load transfer section 110 has a certain orientation with respect to the soil material to be stabilized (see FIG. 2 and FIG. 3). Namely, the end of the load transfer section 110 that is installed at the deepest depth is hereafter referred to as the lower end. The end of the load transfer section 110 that is installed at the shallowest depth is hereafter referred to as the upper end. Accordingly, the upper plate 115 is coupled to the upper end of the load transfer section 110 and the lower plate 120 is coupled to the lower end of the load transfer section 110. The load transfer section 110 is the load transfer portion as well at the intermediary pile section of the load transfer apparatus 100.

Referring now to FIG. 2 and FIG. 3, a cross-sectional view and a cutaway perspective view, respectively, of an example of a soil stabilization system 200 that uses the load transfer apparatus 100 shown in FIG. 1A and FIG. 1B are illustrated. Namely, FIG. 2 and FIG. 3 show a slope 210 that is stabilized using a plurality of the load transfer apparatuses 100 shown in FIG. 1A and FIG. 1B. Absent the soil stabilization system, the slope 210 exhibits a factor of safety against instability that is less than the desired factor of safety. The slope 210 comprises an upper unstable soil mass 215 that is atop a lower relatively stable soil mass 220. The upper unstable soil mass 215 of the slope 210 moves downslope along a failure surface 225 that is above the lower relatively stable soil mass 220.

The soil stabilization system 200 comprises one or more rows of the load transfer apparatuses 100, wherein each row comprises one or more of the load transfer apparatuses 100. Namely, the slope 210 is stabilized using the soil stabilization system 200 that includes the load transfer apparatuses 100 installed at prescribed spacing laterally along the slope face and in the upslope-downslope direction. Generally, the lateral spacing is often from about 3 to about 5 plate widths on-center. Further, each upslope-downslope row may be staggered to efficiently capture the downslope-moving upper unstable soil mass 215. However, other lateral spacing of less than 3 or greater than 5 plate widths on-center are also within the scope of the invention.

In operation, for each load transfer apparatus 100 in the soil stabilization system 200, the upper plate 115 captures the downslope-moving upper unstable soil mass 215 and transfers the applied loads to the intermediary load transfer section 110. The intermediary load transfer section 110 then transfers the applied shear loads and bending moments from the upper plate 115 to the lower plate 120. The lower plate 120 transfers the load from the intermediary load transfer section 110 to the lower relatively stable soil mass 220.

In each load transfer apparatus 100 of the soil stabilization system 200, the upper plate 115 is a soil load transfer plate that is configured to maximize the efficiency of "catching" the unit cells of downslope-moving soil mass, such as the upper unstable soil mass 215. The present invention allows for multiple upper plates 115 to be used for the upper soil load transfer upper plates.

The load transfer section 110 is designed to efficiently transfer the applied loads from the upper plate 115 to the lower plate 120. The applied shear forces from the downslope movements results in a shear force that increases with depth from the top of the element to a maximum at the failure surface 225 and then decreases with depth below the failure surface 225. The load transfer section 110 is configured to have a sufficient strength and cross-sectional area at the interface to adequately transfer the loads. The applied loads also result in bending moments within the load transfer section 110. These bending moments are resisted by a section modulus (S) of the load transfer section 110. An efficient design utilizes a load transfer section 110 that provides adequate shear and bending moment resistance at the lowest total material volume usage.

The lower plate 120, which is the lower soil load transfer plate, is optimized to transfer the loads applied through the load transfer section 110 into the adjacent lower relatively stable soil mass 220. The lower plate 120 is designed to be wide enough so that it transfers load in lateral bearing to the lower relatively stable soil mass 220 without "slicing" into the soil. The design width W2 of the lower plate 120 is based on the shear strength and stiffness of the lower relatively stable soil mass 220, on the applied lateral loads, and other factors. The length L2 of the lower plate 120 is configured to efficiently transfer the applied loads without excessive rotation.

The presently disclosed load transfer apparatus 100 and soil stabilization system 200 overcome the limitations of the prior art by allowing for separate sections to be used for the upper plate 115, the lower plate 120, and the load transfer section 110. This optimizes the use of the materials needed to fabricate the components and provides previously unrealized economy for both material usage and construction efficiency.

Referring now again to FIG. 1A and FIG. 1B, the load transfer section 110, which is also the intermediary pile section coupling together the upper plate 115 and the lower plate 120, has a length L that can vary depending on the thickness of the unstable and/or marginally stable soil mass in which it is to be installed. The length L of the load transfer section 110 may be, for example, from about 3 feet (0.9 m) to about 20 feet (6.1 m), or is about 6 feet (1.8 m) in a specific example.

The load transfer section 110 may consist of materials such as steel, concrete, reinforced plastics, or other materials. The load transfer section 110 may be fabricated using structural channels, angle members, T-sections, S-sections, I-sections, W-sections, C-sections, or other sections commonly associated with steel shapes, such as square tubing (i.e., hollow tubing with square cross-section), rectangular tubing (i.e., hollow tubing with rectangular cross-section), piping (i.e., hollow piping with substantially circular cross-section), a solid bar of any cross-sectional shape, and the like. The cross-sectional dimensions of the load transfer section 110 can vary. In one example, the load transfer section 110 is an S3×5.7 structural steel section of any desired length L.

The upper plate 115 has a length L1, a width W1, and a thickness T1; all of which can vary depending on the configuration of the load transfer apparatus 100. The width W1 of the upper plate 115 can be, for example, from about 3 inches (7.6 cm) to about 5 feet (1.5 m) and is typically in the range of from about 6 inches (15.2 cm) to about 18 inches (45.7 cm). The length L1 of the upper plate 115 is determined based on the thickness of the unstable and/or marginally stable soil mass. Other widths W1 of the upper plate 115 of less than 3 inches (7.6 cm) or greater than 5 feet (1.5 m) are also within the scope of the invention.

The lower plate 120 has a length L2, a width W2, and a thickness T2; all of which can vary depending on the configuration of the load transfer apparatus 100. The width W2 of the lower plate 120 can be, for example, from about 3 inches (7.6 cm) to about 5 feet (1.5 m) and is typically in the range of from about 6 inches (15.2 cm) to about 18 inches (45.7 cm). Other widths W2 of the lower plate 120 of less than 3 inches (7.6 cm) or greater than 5 feet (1.5 m) are also within the scope of the invention. The thickness T1 of the upper plate 115 and the thickness T2 of the lower plate 120 can be, for example, from about ⅛ inches (3 mm) to about 2 inches (50 mm), or is about ¾ inches (19 mm) in a specific example.

The upper plates 115 and the lower plates 120 can be mechanically coupled to the load transfer section 110 by, for example, bolting, welding, or by any other means, such as clips, rails, hooks, and the like. The use of any fastening methods other than welding may, advantageously, allow the load transfer apparatus 100 to be field-assembled. Examples of field-assembled plate piles are described with reference to International App. No. PCT/US13/77407 entitled "Devices and Methods for Slope Stabilization" filed on Dec. 21, 2013, the disclosure of which is incorporated by reference herein.

The load transfer apparatus 100 is not limited to the configuration shown in FIG. 1A and FIGS. 1B and in FIG. 2 and FIG. 3. The load transfer apparatus 100 can be configured in other ways, examples of which are shown and described hereinbelow with reference to FIG. 4A through FIG. 10. In one example, the load transfer apparatus 100 includes one upper plate 115 and one lower plate 120, similar to FIG. 1A and FIG. 1B. In another example, the load transfer apparatus 100 includes multiple upper plates 115 and one lower plate 120. In yet another example, the load transfer apparatus 100 includes one upper plate 115 and multiple lower plates 120. In yet another example, the load transfer apparatus 100 includes multiple upper plates 115 and multiple lower plates 120. In yet another example, the load transfer apparatus 100 includes multiple upper plates 115 and no lower plates 120. Further, the one or more upper plates 115 and the one or more lower plates 120 can be the same size or can be different sizes. Additionally, the one or more upper plates 115 and the one or more lower plates 120 can be mounted on opposite sides of the load transfer section 110 or on the same side of the load transfer section 110.

Referring now to FIG. 4A and FIG. 4B, a configuration of the load transfer apparatus 100 in which the lower plate 120 is narrower than the upper plate 115 is shown. Namely, the width W2 of the lower plate 120 is less than the width W1 of the upper plate 115. In one example, the width W2 of the lower plate 120 is about 8 inches (20 cm) and the width W1 of the upper plate 115 is about 12 inches (30 cm).

Figure 5A:
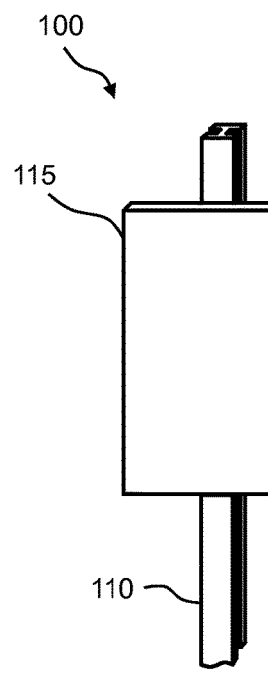
Figure 5B:
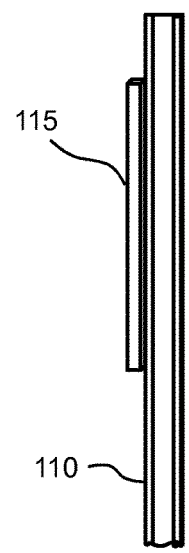

Referring now to FIG. 5A and FIG. 5B, a configuration of a load transfer apparatus 100 that comprises one upper plate 115 and no lower plate 120 is shown (such as in the prior art).

Figure 6A:
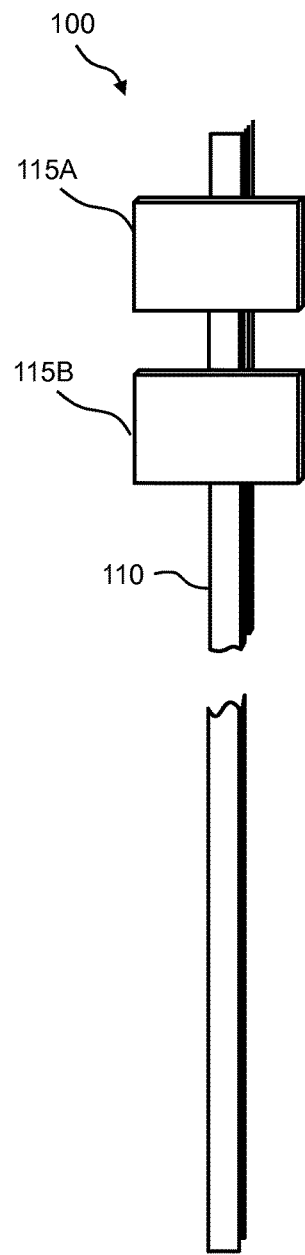
Figure 6B:
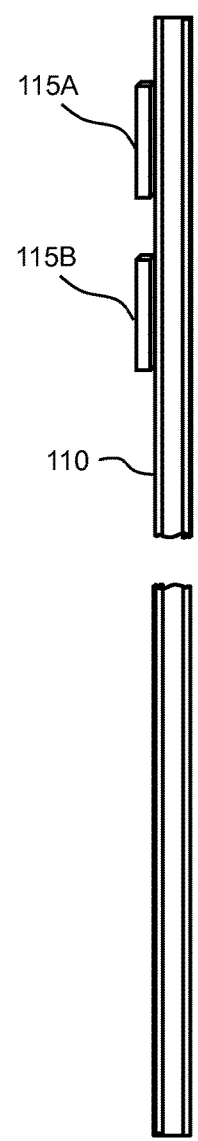

Referring now to FIG. 6A and FIG. 6B, a configuration of the load transfer apparatus 100 that comprises two upper plates 115 and no lower plate 120 is shown. For example, taking the one upper plate 115 shown in FIG. 5A and FIG. 5B and segmenting it into two smaller upper plates 115A, 115B.

Referring now to FIG. 7A and FIG. 7B, a configuration of the load transfer apparatus 100 that comprises the two upper plates 115A and 115B, as shown in FIG. 6A and FIG. 6B, and one lower plate 120, wherein the lower plate 120 is larger than the two upper plates 115A, 115B. In certain other examples, the lower plate 120 may be smaller than the two upper plates 115A and 115B.

Referring now to FIG. 8A and FIG. 8B, a configuration of the load transfer apparatus 100 that comprises the two upper plates 115A and 115B, as shown in FIG. 6A and FIG. 6B, as well as two lower plates 120A, 120B is shown. In this example, the lower plates 120A and 120B are similar in size to the two small upper plates 115A, 115B.

Referring now to FIG. 9A and FIG. 9B, a configuration of the load transfer apparatus 100 that comprises three upper plates 115A, 115B, 115C and no lower plate 120 is shown. For example, taking the one upper plate 115 shown in FIG. 5A and FIG. 5B and segmenting it into three smaller upper plates 115A, 115B, 115C.

Referring now to FIG. 10, a cross-sectional view of another example of the soil stabilization system 200, wherein the load transfer apparatus 100 is the load transfer apparatus 100 shown in FIG. 9A and FIG. 9B. In this example, the slope 210 is stabilized using the load transfer apparatus 100 having multiple upper plates 115 (e.g., upper plates 115A, 115B, 115C) and no lower plate 120. Namely, the soil stabilization system 200 comprises multiple load transfer apparatuses 100 installed at prescribed spacings laterally along the slope face and in the upslope-downslope direction. Generally, the lateral spacings are about 3 to 5 plate widths on-center and each upslope-downslope row is staggered to efficiently capture the downslope-moving upper unstable soil mass 215. Lateral spacings of less than about 3 plate widths or greater than about 5 plate widths are also within the scope of the invention.

Each load transfer apparatus 100 shown in FIG. 10 may include the multiple upper plates 115 and the load transfer section 110. Optionally, the load transfer apparatus 100 may also include one or more lower plates 120. In this example, the multiple upper plates 115 are configured to maximize the efficiency of "catching" the unit cells of downslope-moving soil mass. Furthermore, in this example, the multiple upper plates 115 are configured vertically along the load transfer section 110. Gaps remain between the lower edges and upper edges of the multiple upper plates 115. These gaps represent portions of the upper load transfer section 110 that are not covered by the upper plates 115. The gap between the lower and upper edges of the upper plates 115 depends on the characteristics of the upper unstable soil mass 215 and typically ranges from about 3 inches (7.6 cm) to about 3 feet (0.9 m).

By not including the upper plates 115 at the gap locations, efficiencies are gained by reducing the cost of the upper catch plate materials and also by making the load transfer apparatus 100 lighter and thus easier to handle and drive into the ground. The configuration of the upper plates 115 is designed to promote soil arching along the vertical axis of each of the load transfer apparatuses 100, much like the horizontal spacing of individual load transfer apparatuses 100 promotes arching of the upper unstable soil mass 215 to the load transfer apparatuses 100, which are stable.

Using the load transfer apparatus 100 having multiple upper plates 115 in the soil stabilization system 200 overcomes the limitations of the prior art by harnessing the ability of the upper unstable soil mass 215 to arch vertically to the multiple upper plates 115. This increases the efficiency of the soil stabilization system 200 by reducing the cost of the upper plates 115 and making the components of the load transfer apparatus 100 lighter and easier to handle.

FIG. 11 illustrates a flow diagram of an example of a method 1100 of using the load transfer apparatus 100 to form the soil stabilization system 200. The method 1100 can include, but is not limited to, the following steps.

At a step 1110, a slope is identified that exhibits a factor of safety against instability that is less than the desired factor of safety.

At a step 1115, based on the soil profile of the identified slope, the configuration, size, and number of the load transfer apparatuses 100 to be used in the soil stabilization system 200 is determined. For example, the configuration and number of the load transfer apparatuses 100 as well as the length L of the load transfer section 110; the length L1, width W1, and thickness T1 of upper plates 115, and the length L2, width W2, and thickness T2 of lower plates 120 are determined based on the thickness and other characteristics of the unstable and/or marginally stable soil mass (e.g., the upper unstable soil mass 215).

At a step 1120, a plurality of load transfer apparatuses 100 is provided at the location of the unstable slope. In one example, a plurality of the load transfer apparatus 100 shown in FIG. 1A and FIG. 1B is provided at the location of the unstable slope, such as at slope 210 shown in FIG. 2 and FIG. 3. However, other configurations of the load transfer apparatus 100 can be provided, such as those shown and described with reference to FIG. 4A through FIG. 10.

At a step 1125, the plurality of load transfer apparatuses 100 are spaced apart and driven through the failing or near-failing soil materials and into the underlying unfailing soil materials at a prescribed spacing and to a prescribed depth. The depth and spacing depend on, for example, the depth of the failing or near-failing soil materials, the inclination of the slope face and subsurface soil horizons, groundwater conditions, material shear strengths and stiffness, and required factors of safety against instability, among others.

For example, the plurality of load transfer apparatuses 100 can be installed at prescribed spacing laterally along the slope face and in the upslope-downslope direction. Generally, the lateral spacing is from about 3 to about 5 plate widths on-center and each upslope-downslope row is staggered to efficiently capture the downslope-moving upper unstable soil mass 215. However, other lateral spacing of less than 3 or greater than 5 plate widths on-center are also within the scope of the invention. For example, the upper plates 115 may be spaced from about 2 to about 6 widths apart along each horizontal row, depending on site conditions. However, other spacing of the upper plates 115 of less than 2 or greater than 6 widths apart along each horizontal row are also within the scope of the invention.

Having generally described the presently disclosed load transfer apparatus 100, it is more specifically described by illustration in the following specific EXAMPLES, which further describe different embodiments of the soil load transfer apparatus.

EXAMPLES

Example 1

A series of numerical analyses were performed to compare the presently disclosed load transfer apparatus 100 similar to that described with reference to FIGS. 1A and 1B (referred to hereinbelow as "Tier 3 Plate Pile elements," or "T3 elements") with previous systems (referred to hereinbelow as "Tier 2 Plate Pile elements," or "T2 elements"). An example of the T2 elements are the plate piles described with reference to the International App. No. PCT/US13/77407 entitled "Devices and Methods for Slope Stabilization" filed on Dec. 21, 2013; the entire disclosure of which is incorporated herein by reference.

The shear response of the T2 elements and T3 elements subjected to lateral slope movements were evaluated using the finite difference numerical program LPILE. LPILE is a special-purpose program based on rational procedures for analyzing an embedded pile under lateral loading using the load-deflection (p-y)method. LPILE solves the differential equation for a beam-column using nonlinear lateral load-deflection (p-y) curves. The program computes deflection, bending moment, shear force, and soil response over the length of the laterally loaded pile (Ensoft 2013).

The analyses described herein were performed by applying a uniform lateral movement over the length of the pile equal to the depth of the assumed depth to failure surface. This displacement-based method to evaluate the response of piles in slopes subjected to lateral soil movements is supported by Kourkoulis et al. (2012), Loehr and Brown (2007), and White et al. (2008). The shear response of the plate pile element is equal to the force provided by the element to resist downslope lateral movement. A higher shear response translates to a higher stabilizing force. The greater the shear response, the higher the shear capacity at the same deflection. Thus, for example, a 20% greater shear response translates to using 20% less number of pile elements for the same stabilizing effect.

Referring now to FIG. 12A and FIG. 12B, for the first set of analyses, two soil profiles were considered. Namely, FIG. 12A shows a soil profile 1200 that consisted of 6 feet (1.8 m), or Th1, of soft clay 1210 over a 15 foot (4.5 m), or Th2, layer of stiff clay 1215. FIG. 12B shows a soil profile 1250 that consisted of 15 feet (4.5 m), or Th3, of soft clay 1255. In this example, the plate pile elements are 10 feet (3 m) long, and are laterally loaded by input values of horizontal soil movements over a depth of 6 feet (1.8 m).

FIG. 13 shows a plot 1300 of the shear force response of the plate pile elements when subjected to lateral movements ranging from 0.5 inches (1.3 cm) to 1.5 inches (3.8 cm) for the soil profile 1200. The T3 element provides an increase in shear resistance of 16% to 23% as compared to the T2 element.

FIG. 14 shows a plot 1400 of the shear force response of the plate pile elements when subjected to lateral movements ranging from 0.5 inches (1.3 cm) to 1.5 inches (3.8 cm) for the soil profile 1250. The T3 element provides an increase in shear resistance of 17% to 19% as compared to the T2 element.

It can be concluded that the T3 elements provide greater shear resistance than the T2 elements. The most significant advantage of the T3 element is that it provides adequate shear response for conditions in which there is no underlying stiffer layer, like the soil profile 1250. FIG. 15 shows a plot 1500 that compares the shear response of the T2 elements in the soil profile 1200 (i.e., soil profile with underlying layer of stiff clay 1215) to the response of the T3 elements in the soil profile 1250 (i.e., soft soil profile). The results in FIG. 15 demonstrate that the T3 element can provide a similar response in soil profiles with no underlying stiffer layer as the traditional T2 element installed in a soil profile with an underlying stiffer layer.

It can also be concluded that, for conditions in which there is an underlying stiffer soil layer (the soil profile 1200), using the T3 elements over the T2 elements would provide a reduction of approximately 16% to 20% of required elements for the same design movements.

For the second set of analyses (for the soil profile 1200), the underlying stiff clay 1215 is twice as stiff as the lower clay layer in the previous analyses; the soil profile 1250 remains a soft soil profile over the entire depth. A simple parametric study was performed to compare the shear response of the T2 elements and T3 elements over a range of pile length and depth of horizontal movement. In this example, "d"=depth of horizontal movement as measured from the ground surface and "L"=length of the plate pile element. In this example, the depth of the underlying stiff clay layer varies with pile length; however, in all cases, the pile penetrates the underlying stiff layer by 4 feet (1.2 m).

Figure 16:
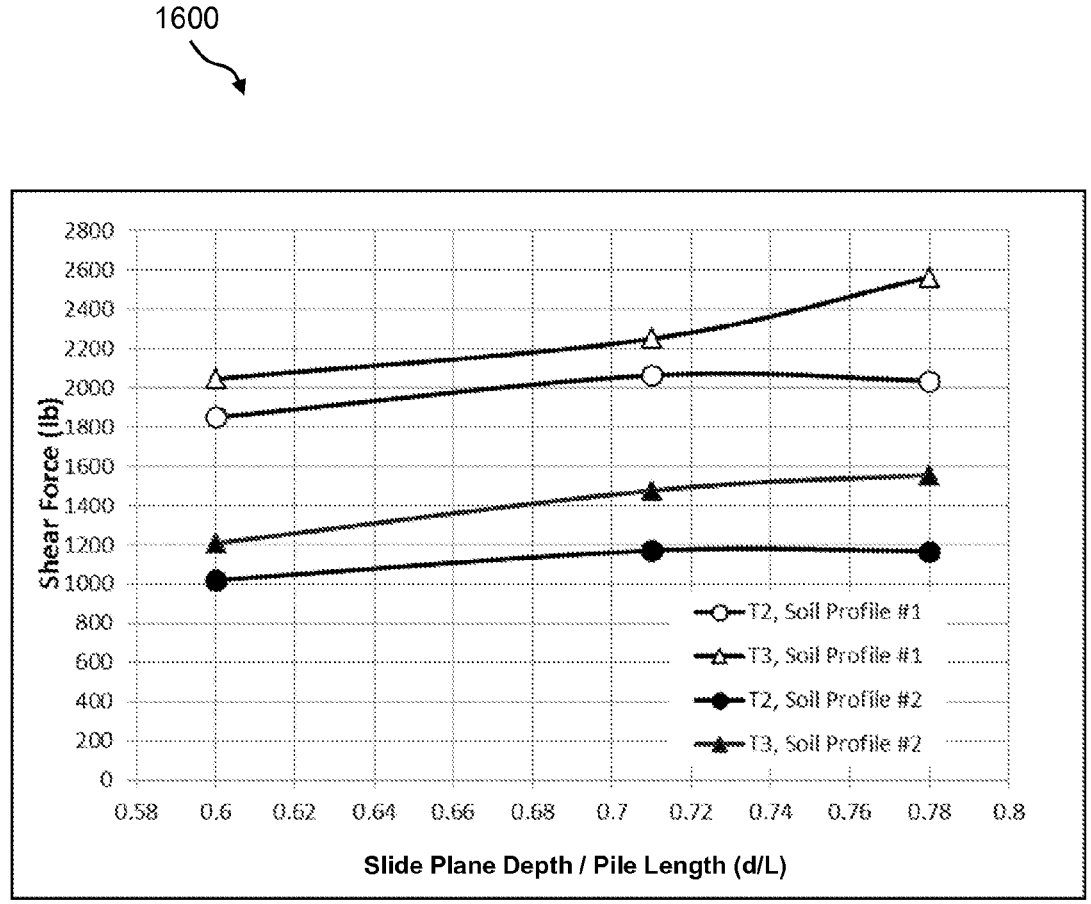

FIG. 16 shows a plot 1600 of the shear response of the T2 elements and the T3 elements over a range of normalized values of the depth at which sliding occurs ("d") divided by the length of the pile element ("L") for both soil profiles for an input value of 1 inch (2.5 cm) of horizontal soil movement. For all the conditions evaluated, the T3 elements provided greater shear response than the T2 elements. For the soil profile 1200, the T3 element provides a 9% to 25% increase of shear force as compared to the T2 element. For the soil profile 1250, the T3 element provides an 18% to 33% increase of shear force as compared to the T2 element. The increase in shear force for the T3 element as compared to the T2 elements increases with increasing normalized value of "d" divided by "L." Again, it can be concluded that the T3 elements provide greater shear resistance than the T2 elements. Therefore, one advantage of the T3 element is that it provides an improved shear response for conditions in which there is no underlying stiffer layer. Another advantage is that for all soil conditions, over a range of pile length and slide depth, using the T3 elements over the T2 elements would provide a reduction of approximately 9% to 30% of required elements for the same design movements.

Example 2

In 2014, steel typically sells for about $0.50 to $1.00 per pound for bare products. For this example, it is assumed that the upper plate of a T2 element has the dimensions of 72 inches (183 cm) by 12 inches (30.5 cm) by ⅜ inches (1 cm), which equals a total plate volume of 0.19 cubic feet (0.058 cubic meters). The density of steel is about 500 pounds per cubic foot. Therefore, in this example, the upper plate of a T2 element would cost about $47 to $94, depending on the cost of steel.

The present invention allows for multiple plates to be used for the upper soil load transfer plate. For this example, it is assumed that instead of a single 72-inch (183-cm) upper plate, two upper plates are used, both with dimensions of 24 inches (137 cm) by 12 inches (30.5 cm) by ⅜ inches (1 cm). Thus, each plate has a volume of 0.0625 cubic feet (0.00177 cubic meters), resulting in a total plate volume of 0.0.125 cubic feet (0.00354 cubic meters). Using the density of steel equal to 500 pounds per cubic foot, the total cost for the two plates decreased to about $31 to $62. In this example, by using multiple plates, the cost of a single plate pile element is reduced by $16 to $32 per element.

Following long-standing patent law convention, the terms "a," "an," and "the" refer to "one or more" when used in this application, including the claims. Thus, for example, reference to "a subject" includes a plurality of subjects, unless the context clearly is to the contrary (e.g., a plurality of subjects), and so forth.

Throughout this specification and the claims, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing amounts, sizes, dimensions, proportions, shapes, formulations, parameters, percentages, parameters, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the presently disclosed subject matter. For example, the term "about," when referring to a value can be meant to encompass variations of, in some embodiments, ±100% in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

Although the foregoing subject matter has been described in some detail by way of illustration and example for purposes of clarity of understanding, it will be understood by those skilled in the art that certain changes and modifications can be practiced within the scope of the appended claims.

We claim:

1. A soil load transfer element comprising:
   a. a load transfer pile comprising a vertical axis, an upper portion, a lower portion, and an intermediary portion between the upper portion and lower portion;
   b. two or more upper plates vertically coupled along the upper portion of the load transfer pile where an L-axis of the two or more upper plates is parallel to the vertical axis of the load transfer pile; and
   c. one or more lower plates vertically coupled along the lower portion of the load transfer pile where an L-axis of the one or more lower plates is parallel to the vertical axis of the load transfer pile;
   wherein the intermediary portion does not comprise plates.

2. The load transfer element of claim 1, comprising three upper plates coupled to the upper portion of the load transfer pile.

3. The load transfer element of claim 1, comprising two lower plates coupled to the lower portion of the load transfer pile.

4. The load transfer element of claim 1, comprising three lower plates coupled to the lower portion of the load transfer pile.

5. The load transfer element of claim 1, wherein the load transfer pile may comprise any one of steel, concrete, and reinforced plastics.

6. The load transfer element of claim 1, wherein the width of the two or more upper plates and one or more lower plates is in the range of about 3 inches (7.6 centimeters) to about 5 feet (1.5 meters).

7. The load transfer element of claim 1, wherein the length of the two or more upper plates is determined based on the thickness of an unstable and/or marginally stable soil mass on or within a slope and/or embankment.

8. A soil load transfer element comprising:
   a. a load transfer pile-comprising a vertical axis, an upper portion, and a lower portion; and
   b. three or more upper plates each vertically coupled along the vertical axis of the load transfer pile at the upper portion, wherein each of the three or more upper plates are longitudinally spaced a distance from each other along the load transfer pile and wherein an L-axis of the three or more upper plates is parallel to the vertical axis of the load transfer pile.

9. The load transfer element of claim 8, comprising one or more lower plates coupled to the lower portion of the load transfer pile.

10. The load transfer element of claim 8, comprising two lower plates coupled to the lower portion of the load transfer pile.

11. The load transfer element of claim 8, comprising three lower plates coupled to the lower portion of the load transfer pile.

12. The load transfer element of claim 8, wherein the load transfer pile may comprise any one of steel, concrete, and reinforced plastics.

13. The load transfer element of claim 8, wherein the width of the three or more upper plates is in the range of about 3 inches (7.6 centimeters) to about 5 feet (1.5 meters).

14. The load transfer element of claim 8, wherein the length of the three or more upper plates is determined based on the thickness of an unstable and/or marginally stable soil mass on or within a slope and/or embankment.

15. A soil load transfer system for stabilizing a slope and/or embankment, the system comprising one or more soil load transfer elements wherein the one or more load transfer elements comprise:
  a. a load transfer pile comprising a vertical axis, an upper portion, a lower portion, and an intermediary portion between the upper portion and lower portion;
  b. two or more upper plates vertically coupled along the upper portion of the load transfer pile where an L-axis of the two or more upper plates is parallel to the vertical axis of the load transfer pile; and
  c. one or more lower plates vertically coupled along the lower portion of the load transfer pile where an L-axis of the one or more lower plates is parallel to the vertical axis of the load transfer pile;
  wherein the intermediary portion does not comprise plates.

16. The system of claim 15, wherein the one or more load transfer elements comprise three upper plates coupled to the upper portion of the load transfer pile.

17. The system of claim 15, wherein the one or more load transfer elements comprise two lower plates coupled to the lower portion of the load transfer pile.

18. The system of claim 15, wherein the one or more load transfer elements comprise three lower plates coupled to the lower portion of the load transfer pile.

19. The system of claim 15, wherein the load transfer pile is configured to have a sufficient strength and cross-sectional area at an interface to adequately transfer the applied loads.

20. The system of claim 15, wherein the applied loads result in bending moments within the load transfer pile, wherein the bending moments are resisted by a section modulus (S) of the load transfer pile.

21. The system of claim 15, wherein the load transfer pile may comprise any one of steel, concrete, and reinforced plastics.

22. The system of claim 15, wherein the width of the two or more upper plates and one or more lower plates is in the range of about 3 inches (7.6 centimeters) to about 5 feet (1.5 meters).

23. The system of claim 15, wherein the length of the two or more upper plates is determined based on the thickness of an unstable and/or marginally stable soil mass on or within the slope and/or embankment.

24. The system of claim 15, wherein the width of the one or more lower plates is wide enough such that it transfers an applied load in lateral bearing to lower stable soil without slicing into the lower stable soil.

25. The system of claim 15, wherein the width of the one or more lower plates is based at least on one or more of shear strength and stiffness of lower stable soil and applied lateral loads.

26. The system of claim 15, wherein the length of the one or more lower plates is configured to transfer applied loads.

27. The system of claim 15, wherein the load transfer pile is configured to transfer applied loads from the two or more upper plates to the one or more lower plates.

28. The system of claim 27, wherein the one or more lower plates is configured to transfer applied loads applied through the load transfer pile into adjacent relatively stable soil.

29. The system of claim 15, comprising a plurality of load transfer elements, wherein the plurality of load transfer elements are installed at a prescribed lateral spacing along the slope and/or embankment face substantially in rows and in an upslope-downslope direction.

30. The system of claim 29, wherein the lateral spacing is in a range of about 3 to about 5 plate widths on-center and each upslope-downslope row is staggered.

31. A soil load transfer system for stabilizing a slope and/or embankment, the system comprising one or more soil load transfer elements wherein the one or more load transfer elements comprise:
  a. a load transfer pile comprising a vertical axis, an upper portion, and a lower portion;
  b. two or more upper plates each vertically coupled along the vertical axis of the load transfer pile at the upper portion; and
  c. one or more lower plates coupled to the lower portion of the load transfer pile;
  wherein each of the two or more upper plates are longitudinally spaced a distance from each other along the load transfer pile and wherein an L-axis of the two or more upper plates is parallel to the vertical axis of the load transfer pile.

32. The system of claim 31, wherein the one or more load transfer elements comprise three upper plates coupled to the upper portion of the load transfer pile.

33. The system of claim 31, wherein the load transfer pile is configured to have a sufficient strength and cross-sectional area at an interface to adequately transfer the applied loads.

34. The system of claim 31, wherein the applied loads result in bending moments within the load transfer pile, wherein the bending moments are resisted by a section modulus (S) of the load transfer pile.

35. The system of claim 31, wherein the load transfer pile may comprise any one of steel, concrete, and reinforced plastics.

36. The system of claim 31, wherein the width of the two or more upper plates is in the range of about 3 inches (7.6 centimeters) to about 5 feet (1.5 meters).

37. The system of claim 31, wherein the length of the two or more upper plates is determined based on the thickness of an unstable and/or marginally stable soil mass on or within the slope and/or embankment.

38. The system of claim 31, wherein the load transfer pile is configured to transfer applied loads from the two or more upper plates to the lower portion of the load transfer pile.

39. The system of claim 31, wherein the width of the one or more lower plates is wide enough such that it transfers an applied load in lateral bearing to lower stable soil without slicing into the lower stable soil.

40. The system of claim 31, wherein the width of the one or more lower plates is based at least on one or more of shear strength and stiffness of lower stable soil and applied lateral loads.

41. The system of claim 31, wherein the length of the one or more lower plates is configured to transfer applied loads.

42. The system of claim 31, wherein the load transfer pile is configured to transfer applied loads from the two or more upper plates to the one or more lower plates.

43. The system of claim 42, wherein the one or more lower plates is configured to transfer applied loads applied through the load transfer pile into adjacent relatively stable soil.

44. The system of claim 31, comprising a plurality of load transfer elements, wherein the plurality of load transfer elements are installed at a prescribed lateral spacing along the slope and/or embankment face substantially in rows and in an upslope-downslope direction.

45. The system of claim 44, wherein the lateral spacing is in a range of about 3 to about 5 plate widths on-center and each upslope-downslope row is staggered.

46. A method for stabilizing a slope and/or embankment, the method comprising:
  a. providing a soil load transfer system comprising one or more load transfer elements wherein the one or more load transfer elements comprise a load transfer pile comprising a vertical axis, an upper portion, a lower portion, and an intermediary portion between the upper portion and lower portion, one or more upper plates vertically coupled along the upper portion of the load transfer pile wherein an L-axis of the one or more upper plates is parallel to the vertical axis of the load transfer pile, and two or more lower plates vertically coupled along the lower portion of the load transfer pile wherein an L-axis of the two or more lower plates is parallel to the vertical axis of the load transfer pile, wherein the intermediary portion does not comprise plates; and
  b. driving the one or more load transfer plate elements through an unstable soil mass into an underlying relatively stable soil mass at a prescribed spacing and depth.

47. The method of claim 46, wherein the one or more load transfer elements are spaced apart and driven to a depth based on one or more of: a depth of the unstable soil mass, an inclination of a slope face, subsurface soil horizons, groundwater conditions, material shear strengths and stiffness, and required factors of safety against instability.

48. The method of claim 46, wherein the one or more upper plates is configured to capture a downslope-moving soil mass and transfer applied loads to the load transfer pile, wherein the load transfer pile transfers the applied loads and bending moments from the one or more upper plates to the two or more lower plates, and further wherein the two or more lower plates transfer the applied loads from the load transfer pile to adjacent relatively stable soil mass.

49. The method of claim 46, wherein the load transfer elements are installed at prescribed lateral spacing along the slope face in substantially rows and in an upslope-downslope direction.

50. The method of claim 49, wherein the lateral spacing is in the range of about 3 to about 5 plate widths on-center and each upslope-downslope row is staggered.

51. A method for stabilizing a slope and/or embankment, the method comprising:
  a. providing a soil load transfer system comprising one or more load transfer elements wherein the one or more load transfer elements comprise a load transfer pile comprising a vertical axis, an upper portion, and a lower portion, two or more upper plates each vertically coupled along the vertical axis of the load transfer pile at the upper portion, wherein each of the two or more upper plates are longitudinally spaced a distance from each other along the load transfer pile and wherein an L-axis of the two or more upper plates is parallel to the vertical axis of the load transfer pile, and one or more lower plates coupled to the lower portion of the load transfer pile; and
  b. driving the one or more load transfer plate elements through an unstable soil mass into an underlying relatively stable soil mass at a prescribed spacing and depth.

52. The method of claim 51, wherein the one or more load transfer elements are spaced apart and driven to a depth based on one or more of: a depth of the unstable soil mass, an inclination of a slope face, subsurface soil horizons, groundwater conditions, material shear strengths and stiffness, and required factors of safety against instability.

53. The method of claim 51, wherein the two or more upper plates are configured to capture a downslope-moving soil mass and transfer applied loads to the load transfer pile, wherein the load transfer pile transfers the applied loads and bending moments from the two or more upper plates to the lower portion, and further wherein the lower portion transfers the applied loads from the load transfer pile to adjacent relatively stable soil mass.

54. The method of claim 51, wherein the two or more upper plates are configured to capture a downslope-moving soil mass and transfer applied loads to the load transfer pile, wherein the load transfer pile transfers the applied loads and bending moments from the two or more upper plates to the one or more lower plates, and further wherein the one or more lower plates transfer the applied loads from the load transfer pile to adjacent relatively stable soil mass.

55. The method of claim 51, wherein the load transfer elements are installed at prescribed lateral spacing along the slope face in substantially rows and in an upslope-downslope direction.

56. The method of claim 55, wherein the lateral spacing is in the range of about 3 to 5 plate widths on-center and each upslope-downslope row is staggered.

57. A soil load transfer element comprising:
  a. a load transfer pile comprising a vertical axis, an upper portion, a lower portion, and an intermediary portion between the upper portion and lower portion;
  b. one or more upper plates vertically coupled along the upper portion of the load transfer pile where an L-axis of the one or more upper plates is parallel to the vertical axis of the load transfer pile; and
  c. two or more lower plates vertically coupled along the lower portion of the load transfer pile where an L-axis of the two or more lower plates is parallel to the vertical axis of the load transfer pile;
  wherein the intermediary portion does not comprise plates.

58. A soil load transfer element comprising:
  a. a load transfer pile-comprising a vertical axis, an upper portion, and a lower portion;
  b. two or more upper plates each vertically coupled along the vertical axis of the load transfer pile at the upper portion, wherein each of the two or more upper plates are longitudinally spaced a distance from each other along the load transfer pile and wherein an L-axis of the two or more upper plates is parallel to the vertical axis of the load transfer pile; and c. one or more lower plates coupled to the lower portion of the load transfer pile.

\* \* \* \* \*